United States Patent
Krebs et al.

(10) Patent No.: US 9,942,704 B2
(45) Date of Patent: Apr. 10, 2018

(54) SYSTEM FOR INSERTION OF LOCATION DATA INTO A SOURCE DEVICE'S STORAGE LOCATION

(71) Applicant: TRIMBLE INC., Sunnyvale, CA (US)

(72) Inventors: Richard C. Krebs, Boulder, CO (US); Cary Steven Kiest, Albany, OR (US)

(73) Assignee: TRIMBLE INC., Sunnyvale, CA (US)

( * ) Notice: Subject to any disclaimer, the term of this patent is extended or adjusted under 35 U.S.C. 154(b) by 0 days.

(21) Appl. No.: 15/249,105

(22) Filed: Aug. 26, 2016

(65) Prior Publication Data

US 2018/0063672 A1    Mar. 1, 2018

(51) Int. Cl.
| | |
|---|---|
| *H04W 4/02* | (2018.01) |
| *H04W 4/70* | (2018.01) |
| *H04W 4/00* | (2018.01) |
| *H04L 29/06* | (2006.01) |
| *H04L 12/749* | (2013.01) |

(52) U.S. Cl.
CPC .......... *H04W 4/02* (2013.01); *H04L 45/741* (2013.01); *H04L 69/16* (2013.01); *H04L 69/22* (2013.01); *H04W 4/005* (2013.01); *H04W 4/70* (2018.02)

(58) Field of Classification Search
CPC ....... H04W 4/02; H04W 64/00; H04W 4/028; H04W 40/24; H04W 56/006; H04W 4/025; H04W 8/24; H04L 67/18; H04M 2250/10; H04M 1/7253; G01S 5/0284
USPC ............................................ 455/456.1–456.6
See application file for complete search history.

(56) References Cited

U.S. PATENT DOCUMENTS

| | | | | |
|---|---|---|---|---|
| 7,884,758 B2* | 2/2011 | Gruchala | ............... | G01S 19/14 342/357.25 |
| 2005/0275530 A1* | 12/2005 | Kates | .................. | G08B 25/009 340/539.22 |
| 2013/0332074 A1* | 12/2013 | Rhee | ..................... | G01C 21/00 701/487 |
| 2014/0006616 A1* | 1/2014 | Aad | ...................... | G06F 21/552 709/225 |
| 2015/0215739 A1* | 7/2015 | Lee | ..................... | A61K 31/167 455/457 |

(Continued)

OTHER PUBLICATIONS http://observer.com/2015/03/can-we-microchip-our-kids-to-prevent-kidnapping/.

(Continued)

*Primary Examiner* — Olumide T Ajibade Akonai
(74) *Attorney, Agent, or Firm* — Marsh Fischmann & Breyfogle LLP; Kent A. Lembke

(57) ABSTRACT

A system for providing locations for each of a plurality of non-Global Positioning System (GPS) enabled devices (e.g., locations of "things" or objects in the IoT, for sensors in a WSN, and so on). The system includes a source device or "thing" including memory (e.g., a long-range sensor in a WSN or the like). The system also includes a portable computing device (e.g., a handheld GPS-enabled device), and the portable computing device includes: (a) a processor; (b) a location-determining assembly operating to determine location information for the portable computing device; and (c) a location-transferring module run by the processor to provide the location information in the memory of the source device (e.g., to copy the information to a predefined storage location for later retrieval and inclusion in predefined parts of a message or data packet).

18 Claims, 5 Drawing Sheets

(56) References Cited

U.S. PATENT DOCUMENTS

2016/0174035 A1* 6/2016 Hughes ................ H04W 4/023
                                                    455/456.3
2016/0234633 A1* 8/2016 Huang .................... H04W 4/02

OTHER PUBLICATIONS http://www.raeco.com/products/gasmonitoring/elkins-earthworks-envision/handheld-trimble-Juno3B-gsq-201111.
http://www.raeco.com/products/gasmonitoring/elkins-earthworks-envision/handheld-trimble-nomad-man-201108.
https://blog.packet-foo.com/2015/08/frame-bytes-vs-frame-file-headers.
http://stackoverflow.com/questions/14762193/get-exact-size-of-iv6-header-including-the-extension-headers.
https://tools.ietf.org/html/rfc2009#page-25.
https://www.comp.nus.edu.sg/~bleong/geographic/related/navas97geocast.pdf.
http://www.cyberjournals.com/papers/Jan2014/02.pdf.
http://www.sersc.org/journals/IJMUE/vol11_no4_2016/33.pdf.

* cited by examiner

SYSTEM FOR INSERTION OF LOCATION DATA INTO A SOURCE DEVICE'S STORAGE LOCATION

BACKGROUND

1. Field of the Invention

The present invention generally relates to providing and operating numerous source devices such as sensors as part of a network or part of the Internet of Things (IoT) or, more generally, any electronic device with a memory chip (or memory) such as a television, a home or business appliance or piece of equipment, and the like and, more particularly, to a method and corresponding system adapted to enable physical objects or devices (labeled "source devices" herein and intended to include any electronic device with memory (e.g., a memory chip)) to know their specific location and to report this information out (e.g., as part of periodic reporting to a central server/monitoring device and/or in response to queries for other data (such as sensor readings/measurements).

2. Relevant Background

The Internet of Things (IoT) is the network of physical devices embedded with electronics, software/hardware, and network connectivity (typically, wireless communication abilities) that enable these physical devices or objects to collect and exchange data. The IoT allows objects to be sensed and controlled remotely across existing network infrastructure, and this creates opportunities for more direct integration of the physical world into computer-based systems. The IoT can be used in many ways such as to provide smart grids, smart homes, intelligent transportation, and smart cities. Each "thing" or source device is uniquely identifiable through its embedded computing system but is able to interoperate within the existing Internet infrastructure, and some experts estimate that the IoT will include fifty billion source devices by 2020.

Wireless Sensor Networks (WSNs) provide one specific example of the IoT. WSNs are typically made up of thousands to millions of small, low cost devices (e.g., sensors). Each device is typically battery powered and has limited processing and memory resources and transfers or reports sensor data limited by a relatively small packet payload size. WSNs may have a wide variety of uses such as structural health monitoring (e.g., with strain gages/sensors), water system monitoring (e.g., with pressure sensors and the like), energy monitoring, machine condition monitoring, and transportation management. Connecting networks of these source devices directly to the Internet to transfer sensor data to Internet users is useful to allow the users to observe data in real time to monitor and manage diverse systems and equipment.

In the IoT, there are many situations where it is desirable or even critical to know the precise geographic (or physical) location of the thing or source device. In many WSN applications, it is important, such as for environmental surveillance and disaster management, to have the location of each of the sensors in the WSN. One solution would be to equip each source device with a global navigation satellite system (GNSS) receiver such as a GPS receiver to provide location information for the source device, but this is generally a much too costly solution in terms of money and energy consumption. For example, a city may install a multitude of stationary sensors on their water system or a train company may apply sensors along their train tracks in numerous locations, and even a small reduction in cost may make such a WSN desirable from a cost perspective. Presently, each source device can be fabricated to determine its location with a GPS chip and an antenna at a cost of about $1 to $10 USD per sensor. This positioning ability, hence, can significantly and unacceptably increase the cost of the WSN when large numbers of sensors are utilized (e.g., many thousands or millions may be used in some WSNs). Further, GPS receivers often fail inside buildings and under heavy vegetative cover such that the location data would be unavailable or inaccurate, and many WSNs include sensors in such settings where their data may be unavailable or inaccurate.

Another solution for providing locations of sensors is to have each sensor location manually determined and recorded by the installing technician such as on a notebook and later transcribed in a central database. This sensor location data can then be linked at a central server or monitoring station to each of the sensors of a WSN (or source devices in the IoT). However, this approach is time consuming and inefficient, and the technicians may make errors in determining a physical location or writing the location down or in recording/storing locations for some sensors (or even forget to store this data for some of the sensors). As a result, the manual localization solution generally is not acceptable for use in WSNs even when relatively small numbers of sensors are networked together.

Hence, there remains a need for an improved method for determining the physical location (e.g., X-Y or geospatial coordinates that may include altitude) of a sensor or other source device, for storing this location information (or data), and for reporting the location information out to other devices in the network (e.g., to a central monitoring station or server or to a workstation via the Internet/cloud).

SUMMARY

The inventors recognized that there is a large demand from businesses, governments, and others to know where all their assets are located including their networked source devices or "things" in the IoT (and, in this description "source devices" are any electronic devices with memory). Further, the inventors discovered a relatively precise location can be provided for each source device without the need for an embedded GPS chip and antenna in each source device. This significantly reduces the cost of each of the source devices, such as the long-range sensors provided in many WSNs. To achieve this goal, a system or network is described that is configured to determine the physical location of a source device, to transfer the physical location (or location data/information) onto the memory or data storage of the source device (e.g., onto a memory chip of nearly any electronic device with sensors just being one useful example), and to communicate or report the physical location (or location data/information) of the source device with each of its outgoing communications (e.g., to a central server or monitoring station communicatively linked to the source device or to a particular workstation or operator device accessing the source device via the Internet or other communication network).

Briefly, the system includes one or more source devices (or object/things in the IoT such as sensors in a WSN) and at least one portable (e.g., handheld) computer or computing device (e.g., any electronic device with computing and communication abilities as discussed herein). The portable computing device includes a locating assembly (or physical location determination mechanism) such as a GNSS receiver (e.g., a GPS receiver) that an operator or technician positions near (e.g., within about 1 foot in many source device locations) one of the source devices and then operates to determine accurate location information (e.g., X-Y or latitude and longitude coordinates, time, and, in some cases, altitude). The portable computing device also includes a location transfer module (e.g., a software application) that, once initiated by the portable computing device, functions to establish a communication session with the source device (via a wired or wireless connection with the source device) and to store the location information in the memory/data storage of the source device (e.g., at a predefined storage location and in a predefined format for later transfer). The system further includes a central server or client device communicatively linked, typically wirelessly, to the source device receiving a message (e.g., a data packet transmitted periodically by the source device or in response to a query or ping of the source device by the central server or client device) from the source device, and this message includes the previously stored location information for the source device. For example, the header or a portion of the data field (e.g., end of the data field) of each message from the source device (e.g., sensor in a WSN) would include the position of the source device.

More particularly, a system is described that is configured for providing locations for each of a plurality of non-Global Positioning System (GPS) enabled devices (e.g., "things" or objects in the IoT, sensors in a WSN, and other electronic devices with memory). The system includes a source device including memory (e.g., a long-range sensor in a WSN or the like with a memory chip or other data storage that may be nonvolatile so do not have to reload the location information each time a battery is changed or may be volatile with the process of storing location information being performed with each battery installation). The system also includes a portable computing device (e.g., a handheld GPS-enabled device), and the portable computing device includes: (a) a processor; (b) a location-determining assembly operating to determine location information for the portable computing device; and (c) a location-transferring module run by the processor to provide the location information in the memory of the source device (e.g., to copy the information to a predefined storage location for later retrieval and inclusion in predefined parts of a message or data packet).

In practice, the source device is a non-GPS-enabled device (i.e., is a device that does not include devices for gathering location information). In some embodiments, the location information is GPS-related information including latitude and longitude coordinates of the portable computing device, and the location information may further include an altitude of the portable computing device and a precise time for when the location information was gathered. In some specific cases, the location-determining assembly includes a GNSS receiver (e.g., a GPS receiver), and the location-transferring module is run by the processor to establish a communication session with the source device.

During operations, the location-determining assembly is operated to determine the location information when the portable computing device is in a location gathering position relative to the source device. In some cases, the location gathering position is at a location within 12 inches of the source device and more typically within 6 inches or even within 1 inch (e.g., placed on or in contact with the source devices such as on/over a sensor placed on a surface of a structure, a piece of equipment, a monitored machine, or the like). In some cases, the location-determining assembly is unable to effectively capture the location data at the location/position of the source device (e.g., GPS devices often are inaccurate indoors or under various coverings including thick vegetation). In such cases, the location information is modified based on an offset of the location gathering position from a physical location of the source device during the determining of the location information.

In some embodiments, the source device is configured for wireless communications to a remote client device, and the source device transmits at least a portion of the location information in the memory in a message to the remote client device. In such embodiments, the wireless communications include TCP/IP-based communications (or other network communication protocol may be used), and the message comprises an IP packet (or other network protocol-compliant packet with these packets (including IP packets) referred generally herein as digital communications packets, network-communications packets, and the like) including the portion of the location information. In a more specific example, the IP packet is an IPv4 packet, and the portion of the location information is provided in the data field of the IPv4 packet such as at the end of the data field of the IPv4 packet. In another specific example, the IP packet is an IPv6 packet, and the portion of the location information is provided in a spare field(s) of the header of the IPv6 packet or in the data field of the IPv6 packet (e.g., at the end of the data section of the IPv6 packet).

DETAILED DESCRIPTION

In general, the following describes systems and methods for allowing remote devices or source devices to know and later deliver their physical location (e.g., location coordinates and altitude). These source devices may be nearly any electronic device with memory (e.g., a memory chip) such as television, a home or office appliance, or an object or "thing" in the IoT, with one useful example being long range sensors of a WSN (and this electronic device is used in many of the non-limiting examples provided herein). In TCP/IP-based communications, as another example, it is often useful to know where the originating IP address physically resides. The system (and associated method) of the present description teaches use of a portable device, which is enabled to determine its location (e.g., a GPS-enabled device), to "insert" its location information (e.g., GPS coordinates and altitude) into a source device that is not configured to determine its own location (e.g., a non-GPS enabled communicating device). The source device is then configured to embed the location information (e.g., location coordinates and altitude) from its memory/data storage into its outgoing messages such as by embedding GPS-related information in the IP packet (or another network protocol-based packet) for use by a receiving device.

Figure 1:
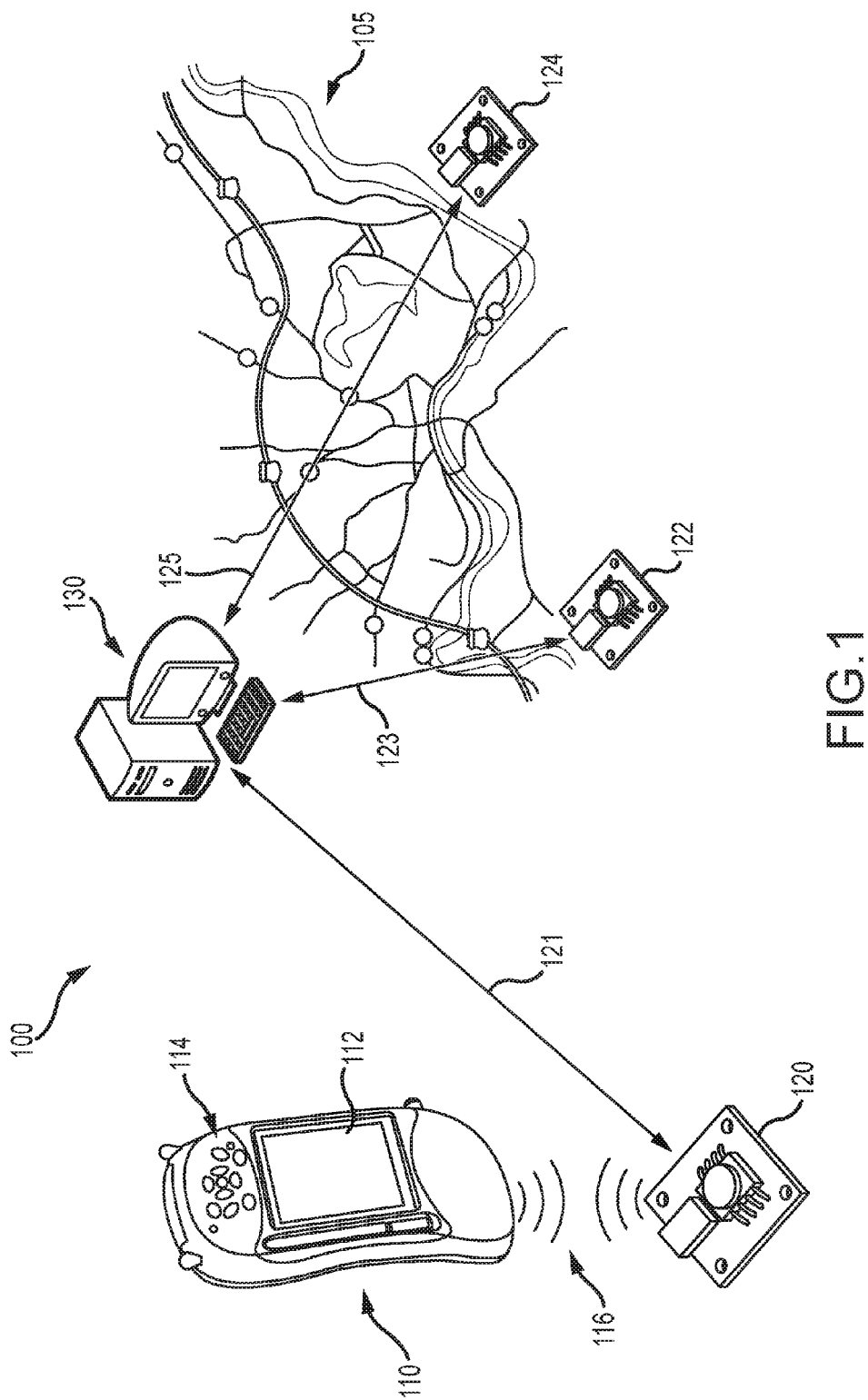
FIG. 1 illustrates a system (or network), such as a WSN or a portion of the IoT, according to one embodiment of the present description.

FIG. 1 illustrates a system (or network such as a WSN or the like) 100 configured according to the present description to embed location data or information (e.g., location coordinates and altitude) into the memory/data storage of objects or source devices that may be networked together (e.g., "things" in the IoT). The system 100 includes a portable computing device or computer (or electronic device) 110 with a touchscreen 112 and a keyboard or input buttons 114 for receiving input from an operator (not shown in FIG. 1). The portable computing device 110 is configured to carry out several functions of the presently-described source device localization techniques.

To this end, the portable computing device 110 may take the form of a handheld device that is configured to determine its present physical location. To this end, the device 110 may include a location or position sensor (or location-determining device), such as a GNSS receiver (e.g., a GPS receiver), that operates to gather location data (e.g., 3D coordinates or GPS coordinates (e.g., location coordinates) along with altitude of the device 110). The location-determining device of the portable computing device 110 may take a wide variety of forms to practice the system 100, and, in some embodiments, the computing device 110 (e.g., with software and/or hardware modifications and/or additions to carry out additional features of the source device localization techniques taught herein) is a handheld computer with GNSS such as those available from Trimble Navigation Limited (e.g., the Trimble Geo 7 Series, the Trimble Juno 5 Series, the TDC100 Series, the Trimble Juno 3 Series, the Trimble Juno SD, the Trimble Juno SA, the Nomad 1050 Series, the Nomad 900G series, the Yuma 2 Rugged Tablet Computer, or the like) that may provide GPS coordinates and/or GIS data (e.g., location coordinates and altitude). The portable computing device 110 includes a processor (or processors) that act to store the GPS-related information and/or other location information (e.g., coordinates, altitude, and precise time in some embodiments) at least temporarily in memory/data storage on the device 110. The location information may be gathered or obtained by the device 110 in response to user input via the touchscreen 112 (e.g., a GUI may be generated and displayed on this screen 112) or one or more of the buttons or keys 114 (e.g., a button or icon may be selected that initiates the functionality of the device 110 causing location information (location coordinates and altitude) to be embedded in memory/data storage of a source device in system 100).

Significantly, the system 100 further includes one-to-many source devices 120, 122, 124 (which may be any electronic device with memory) that are positioned at various locations in a geographical space 105, as represented with the map features. As discussed above, the source devices 120, 122, 124 may take many forms to implement the system 100 such as long range sensors or other electronic devices or objects (or "things") that are configured to communicate in a wired or, more typically, wireless manner as shown with arrows 121, 123, 125 with a central server, a computing device, a client device, or the like 130. In the case of sensors, the source devices 120, 122, 124 include one or more sensing devices that sense or gather information about the local environment or a machine/structure which they are mounted upon (e.g., pressure, strain, temperature, gases, and so on), and this sensed information is transmitted in messages 121, 123, 125 to the central server or client device 130, e.g., over existing wireless communications structure such as those supporting cloud communications and/or the Internet. For example, the communications 121, 123, 125 may be TCP/IP-based communications (or other useful network protocol communications), and it may be desirable to know where the originating source device 120, 122, 124 (or IP address) physically resides anywhere in the world.

To this end, the system 100 includes the GPS (or other location-determination technology)-enabled device 110 that is configured or adapted to "insert" location information (such as GPS coordinates (or other location coordinates) and altitude) into memory/data storage of the non-GPS-enabled source devices 120, 122, 124. Each of the source devices 120, 122, 124 then acts to communicate the embedded/stored location information in the messages 121, 123, 125 to the central server, client device, or other communicating device 130. For example, the location information (e.g., GPS-related information and altitude at a storage location in the memory of the devices 120, 122, 124) from the portable computing device 110 may be embedded or provided in the IP packet (or other network communication protocol packet) communicated 121, 123, 125 (e.g., communications according to the Internet protocol or some other packet protocol) to the receiving device 130 for its use in determining the location of each of the source devices 120, 122, 124 in the system 100.

According to the localization methods taught herein, the operator or user of the device 110 moves or positions the device 110 as close as practical to one of the source devices 120 such as within 12 inches or more preferably within 6 inches and more preferable upon or in contact with (e.g., within about 1 inch of) the source device 120, which is typically mounted upon a stationary structure/surface (not shown) in the physical space 105 such that the location information (location coordinates and altitude) continues to be accurate over time. The operator or user then initiates the location-determining element or assembly of the portable computing device 110 (e.g., a GPS sensor or assembly) to determine a set of location information (e.g., longitude and latitude coordinates (or other location coordinates), altitude, and precise time).

The portable computing device 110 includes a location transfer module (e.g., a software application) that is next initiated by an operator/user of the portable computing device, such as via the user input devices 112 and/or 114, and that functions to establish a communication session (shown at 116, which may be wired (such as with a USB connection on the source device 120) or wireless with a transceiver on the source device 120) with the source device 120 and to store the location information in the memory/data storage of the source device 120 (e.g., at a predefined storage location and in a predefined format for later transfer to the client device/central server 130). Once the location information is stored in the memory of the sensor 120, it can be used as part of the data transmitted in data packets/messages 121 in response to particular inquiries from the server/client device 130 (e.g., "where are you located?") or in every standard data packet 121 so the server/client device 130 knows the location of the source device (e.g., sensor) 120 at all times. Similar processes are followed for each of the source devices or "things" 122 and 124 (e.g., electronic device with a memory chip) in the system 100, such as when each is installed or after installation (such as for source devices installed prior to the inventors' development of the portable computing device 110 or upon a changing of a battery if memory is volatile).

Figure 2:
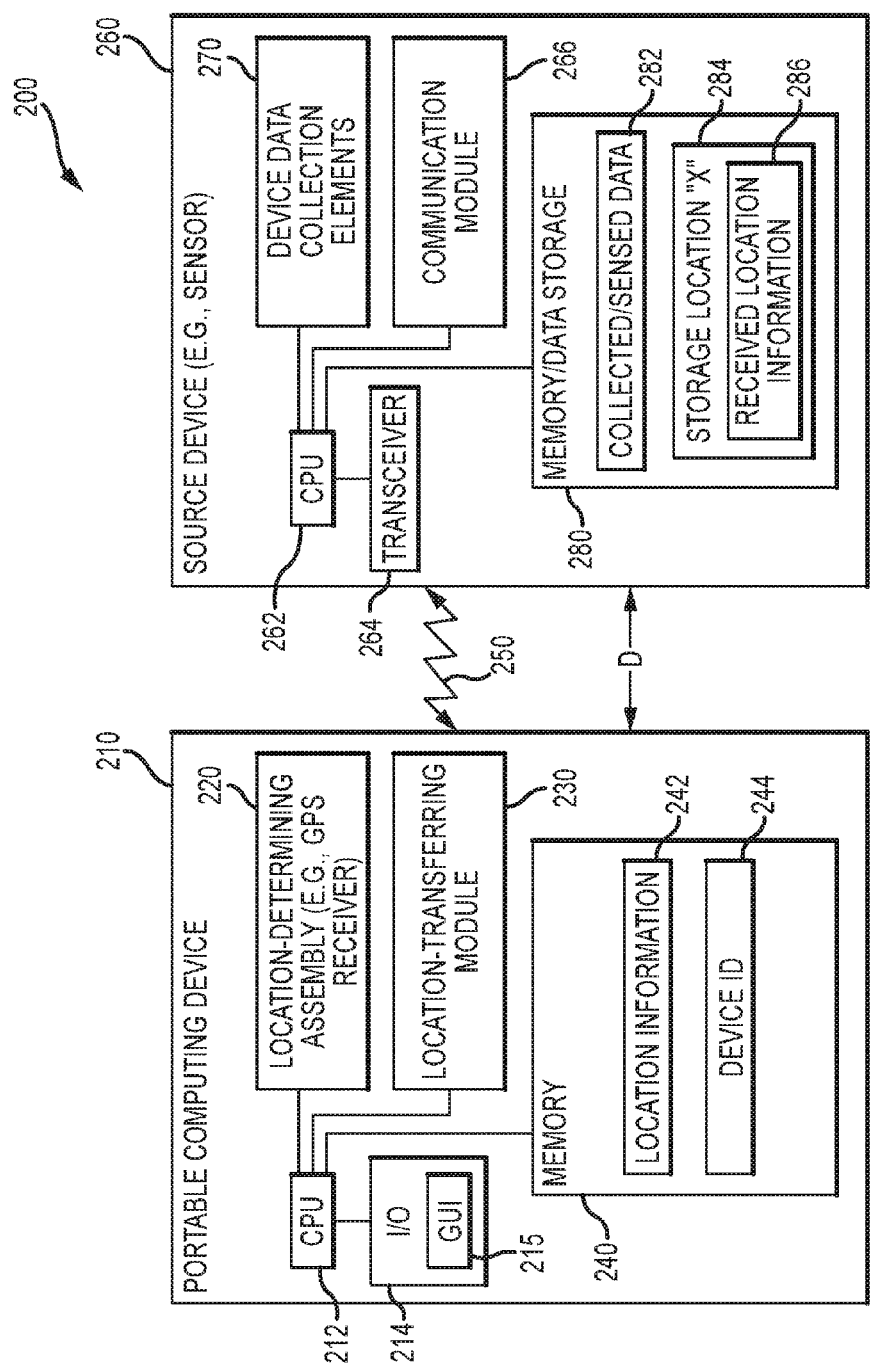
FIG. 2 is a functional block diagram of a portion of a system/network of the present description (e.g., a portion of an implementation of the system of FIG. 1) showing the GPS-enabled computing device and a source device or object in more detail.

FIG. 2 illustrates a portion of a system/network 200 of the present description that includes a portable (e.g., handheld) computing device 210 in communication (as shown at 250) with a source device 260 (e.g., a sensor or other object adapted for wireless TCP/IP-based communications or other digital network communications with differing data packet protocols). The portable computing device 210 includes a processor 212 managing operations of input/output (I/O) devices 214 that may include communication components for providing the wired or wireless communications 250 with the source device 260. The I/O devices 214 may also include a monitor or touchscreen operable by the device 210 (and its software) to provide a graphical user interface (GUI) 215 that may prompt an operator of the device 210 to initiate functions including determining a present location (e.g., location coordinates and altitude) of the device 210 and transferring of such a location to the source device 260.

To this end, the portable computing device 210 includes a location-determining assembly 220 that is operated or initiated by the processor 212 in response to user input (e.g., via GUI 215) to obtain location information for the device 210 that is stored (at least temporarily) in memory 240 as shown at 242. The location information 242 may be collected when the portable computing device 210 is positioned by its operator proximate to the source device 260, e.g., within a predefined distance (e.g., 0 to 12 inches or the like), so that the location information 242 for the handheld computing device 210 identifies the location of the source device 260 (or a space in which the source device 260 is likely located such as a sphere with a diameter matching the distance, d, between the two devices 210, 260 when the location information 242 is collected). The location-determining assembly 220 may take the form of a GNSS or similar receiver (e.g., a GPS-based assembly) that collects GPS-based information that may include latitude and longitude coordinates, an altitude, and a precise time.

In some embodiments, the location-determining assembly 220 further includes software that functions to prompt the user (such as via GUI 215 or other portions of the I/O devices 214) to adjust or modify the location information. For example, the source device 260 may be in a location where it is not possible or effective to operate the location-determining assembly 220 (e.g., indoors so that a GPS-based sensor may be ineffective or inaccurate). The operator may have, in response to this issue, positioned the portable computing device 210 in a location relative to the location of the source device 260 where the location-determining assembly 220 can accurately collect/determine the location information 242. Then, upon being prompted by the location-determining assembly 220 or other software on the device 210, the operator may adjust the location information to reflect the offset (e.g., the distance, d, if in the same plane and/or an adjustment in height if in a different plane than the source device 260) between the two devices 210, 260 at the time the location information 242 was initially gathered, and this modified location information 242 can then be transferred to or embedded into the memory/data storage 280 of the source device 260.

In some embodiments, this "offsetting" or obtaining a set of location information for an indoor source device is performed automatically by the handheld computing device, which is running (or includes) a software package for the particular purpose of obtaining location coordinates and altitude of a device when its GPS (or other location-determining) device is not useful. This software package acts to "translate" GPS coordinates it can accurately measure to locations indoors (e.g., providing the "offset" for the device operator). For example, the software package may take as input the GPS coordinate measured by the device's location-determining components/assembly on a window and move 10 feet (or some other measured distance from the window where measurements are accurately obtained) inside (e.g., to the location of the source device 260, for example) and then intersect that with another window GPS reading and move 10 feet inside (again, to the location of the source device 260). In another example, a first window (or GPS suitable) location is measured (at a particular altitude) to have a GPS measurement of 39.53'56.14"N; 105.07'33.40"W, a second window (or GPS suitable) location is measure (at the same altitude) to have a GPS measurement of 39.53'5694"N; 105.07'33.12"W, and the two offsets are measured, respectively, as 28.11 feet and 23.34 feet. The software package functions to determine a pseudo or indoor GPS measurement of 39.53'56.17"N; 105.07'33.14"W, which becomes the point absolute in internal GPS coordinate vectors main reference point for the source device. Note, the accuracy of the internal or indoor location information is limited by the accuracy of the offset measurements (e.g., whether made with a tape measure or manual tool or a digital, high-accuracy tool (such as a Trimble MCS laser distance finder or the like)). Therefore, the software package is able to identify a specific point absolute with additional measurement errors considered by the software package. This software package or tool provided on the handheld computing device will be very useful in many applications, e.g., such as when creating vectors off of phased-array Wi-Fi access points to do intersections to locate "things" dynamically indoors, for providing a pseudo indoor GPS location (pseudo location coordinates and altitude rather than directly measured information).

The object or source device 260 includes a processor 262 (or processing device, more generally, that may include a programmed gate array) that manages via running software (executing code in computer readable media) such as communications module 266 operations of a transceiver to communicate 250 with the portable computing device 210. Further, the source device 260 includes, in some cases, one or more device data collection elements (e.g., environmental parameter sensing components) 270 that collect data that is stored as shown at 282 by the processor 262 in the device's memory or data storage 280. The data 282 is typically transmitted in messages to a central server, client device, or the like via wireless communications as shown in FIG. 1. Often, the source device 260 is adapted with its communications module 266 and transceiver 264 to communicate with TCP/IP-based communications (but other protocols may be used, of course), and the collected or sensed data 282 is provided in a data section of a data packet (or IP packet or other protocol-based packet).

Further, the processor 262 (with execution of the communication module 266 in some cases) functions to store location information (information 242 that includes location coordinates and altitude) received from the portable computing device 210 via communications 250 as shown at 286, and this location information 286 may be stored at a particular storage location 284. In this manner, the communications module 266 operates to include the received location information 286 in each data packet it transmits out (e.g., in the data field for IPv4 packets (e.g., at the end) and in the spare fields of the header or in the data field (e.g., at the end) for IPv6 packets). This is explained in more detail with reference to FIG. 4.

During operations, the location-transferring module 230 acts to establish a communication session 250 with the source device 260. The module 230 includes programming that allows the two devices 210, 260 to communicate (wired or wirelessly (e.g., using Bluetooth LE or the like), including which communication protocols to follow and how to format the messages (e.g., to provide payload coding) that act to transfer or embed the location information 242 into the storage location 284 as shown at 286 during the communication session 250. The initial steps of establishing the link 250 may involve the computing device acting to perform a security handshake or the like in which the source device 260 via its communication module 266 may operate to verify (such as with processing of the device ID 244 of the portable computing device 210) or authenticate that the portable computing device 210 is authorized to provide/embed the location information 286 in its memory 280.

Figure 3:
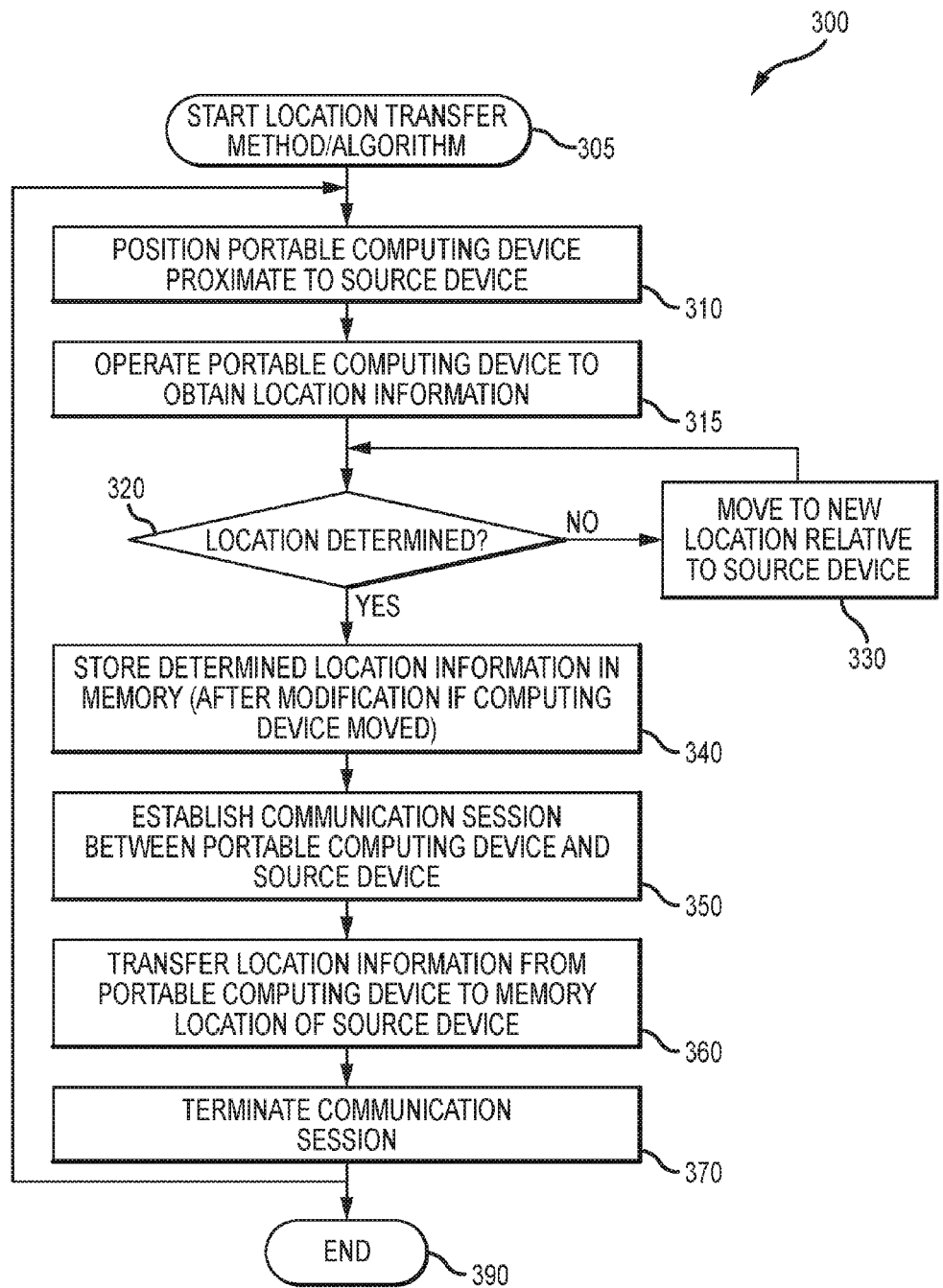
FIG. 3 is a flow diagram of a method/algorithm for providing location information in the memory of a non-GPS-enabled device/object such as a long range sensor of a WSN or "thing" of a portion/network of the IoT.

FIG. 3 is a flow diagram of a method/algorithm 300 for providing location information in the memory of a non-GPS-enabled device/object (e.g., any electronic device with a memory chip) such as a long range sensor of a WSN or "thing" of a portion/network of the IoT (such as by operation of the system 100 or the system 200). As shown, the method 300 begins at 305 such as with loading software or an application onto a handheld GPS-enabled device to support embedding location information onto a source device (e.g., sensor of a WSN or other object provided in a subnetwork of the IoT). Step 305 may also include mounting or positioning the non-GPS-enabled device (or source device) in a physical space (such as on a surface of a stationary structure), and, in some cases, this source device is configured (e.g., with software or a communication module/application) to support communications with handheld GPS-enabled devices (e.g., to enable establishment of communication sessions between the two devices).

The method 300 continues at 310 with an operator positioning the portable computing device (e.g., GPS-enabled device) proximate to the source device. In other words, the operator in step 310 should act to try to place the portable computing device as close as practical (e.g., within 12 inches, more preferably within 6 inches, and more preferably on or in contact (e.g., within 1 inch)) to the source device such that the two devices are for practical purposes at the same location in the physical space. At 315, the method 300 continues with operating the portable computing device to obtain (or attempt to obtain) location information, which may be GPS-related information such as latitude and longitude coordinates, an altitude, and a precise time of the measurement.

The method 300 continues at 320 with determining whether the location determination was successful at 315. For example, the GPS assembly of the computing device may be programmed to report an error message or failure message if it is unable to gather GPS information and/or confirmation may be provided that the location-determining assembly/mechanism was able to accurately obtain the location information. The failure may occur when the source device is indoors or under heavier vegetative cover. If the location was not determined (or not accurately determined) at 320, the method 300 continues at 330 with the operator moving the portable computing device to a new location spaced apart some increased distance from the source device such as at or outside a window in a building containing the source device. Steps 315-330 are repeated until the location information is obtained, and an offset indoor GPS program may be run/used for obtaining the offset or indoor coordinates (location coordinates and altitude for electronic devices located indoors or other places where GPS and other devices may be unable to accurately obtain the location information).

Then, at 340, the location information is stored in the memory of the portable computing device, with modification to reflect the offset location of the computing device if needed at step 330. Then, at 350, the method/algorithm 300 continues with operating the portable computing device to establish a communication session with the source device corresponding with the location information gathered in step 315. This may be achieved solely by operations of a location transferring module (software) on the portable computing device, with this application knowing how to communicate (e.g., communications protocol and data format expected by the source device/sensor) with the source device, or in combination with intelligence on the source device in some cases (e.g., the source device may only allow communications with authorized devices such as by with implementation of a security handshake or other useful process).

The method 300 continues at step 360 with the portable computing device transferring the location information gathered (and modified if needed to reflect a location offset with the source device) in step 315 to the source device. Step 360 may involve storing the location information with a predefined format at a predefined memory location of the source device to facilitate the location information later being included in a data packet (or other message) communicated to other devices networked with the source device (e.g., included at the end of the data section of the data packet or in a spare field of the header of the data packet with TCP/IP communications). The method 300 then may involve termination of the communication session at 370 upon successful completion of the transfer (e.g., copying) of the location information from the portable computing device to the onboard memory/data storage of the source device (e.g., the memory chip of a long range sensor or other object/thing in a network such as a network within the IoT). The method 300 may continue for another source device at step 310 with positioning the portable computing device adjacent to a second or new source device. Alternatively, the method 300 may end at 390.

Figure 4:
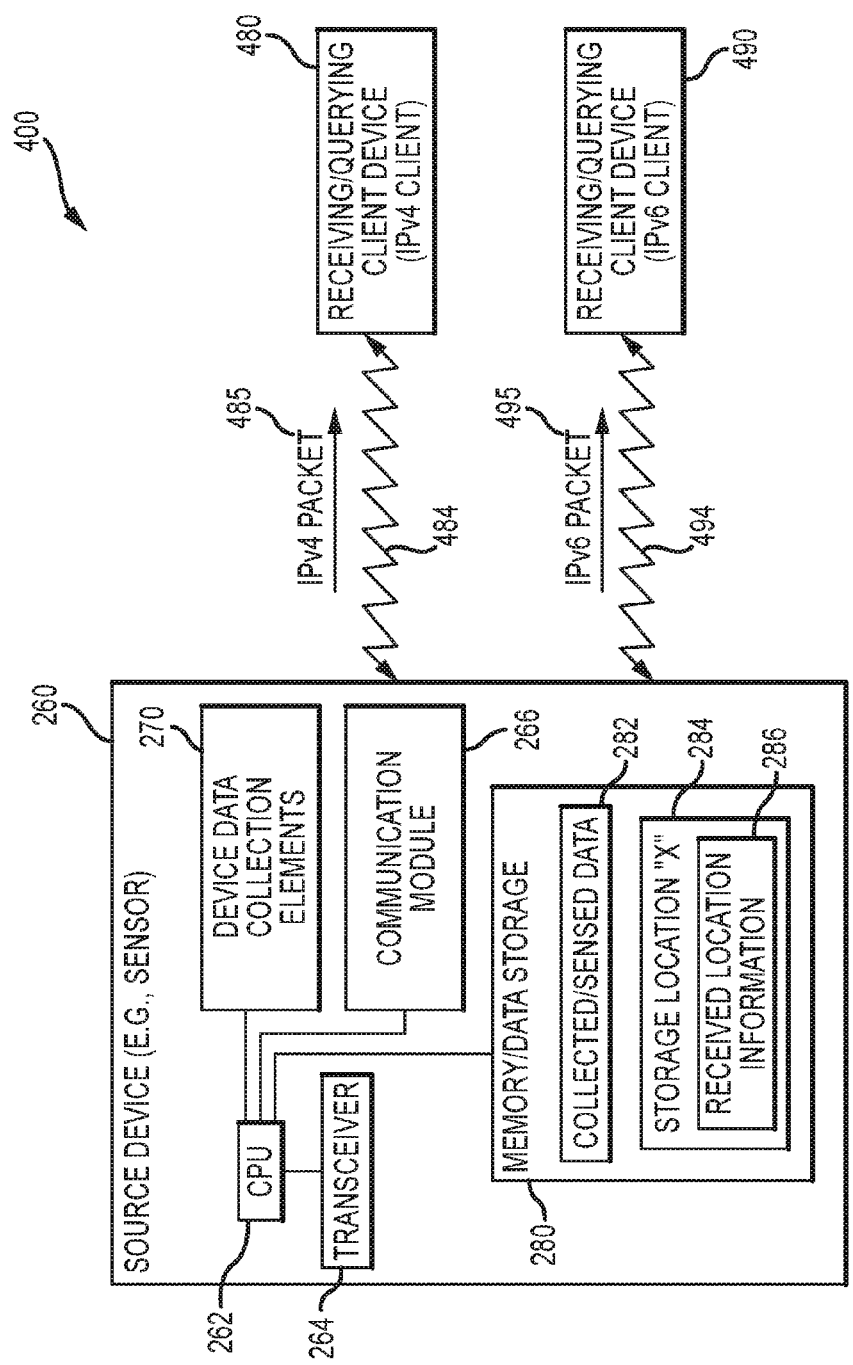
FIG. 4 is a functional block diagram of a portion of a system/network of the present description (e.g., a portion of the system of FIG. 1) showing communications between the source device and the receiving end device (or client device)

FIG. 4 is a functional block diagram of a portion of a system/network 400 of the present description (e.g., a portion of the system of FIG. 1) showing communications between the source device 260 (of FIG. 2) and a receiving end device (or client device). Particularly, as discussed above, the source device 260 is shown to have location information (e.g., location coordinates and altitude) 286 stored at a particular location 284 in its memory/data storage 280. Hence, when it communicates with another device in response to a query for this information or upon periodic uploading of its data (e.g., of its collected/sensed data 282), the source device 260 operates (such as with its communication module 266 and transceiver) to wirelessly (or in a wired manner in some less common applications) transmit messages or data packets to the receiving device (such as a central server gathering sensor data in a WSN or the like). It is likely that in many applications the source device will be configured for TCP/IP communications with such a receiving device and will transmit data packets in the form of IP packets (but other network communication protocols and packets formatted to such protocols may be used with conventional IP protocols being one very common, but not limiting, packet protocol).

As an example of such communications, the source device 260 may be configured for TCP/IP communications under the fourth version of the Internet Protocol (IP) or to provide IPv4 data packets to a receiving/querying client device 480 (e.g., an IPv4 client). In these cases, a communication link 484 is established according to IPv4 between the source device 260 and the receiving client device 480, and the source device 260 transmits an IPv4 data packet 485 to the receiving client device 480. According to the present description, the source device 260 is configured to include the received location information 286 (or a portion thereof) in the IPv4 data packet 485. In some embodiments, the received location information (e.g., GPS-related information (location coordinates and altitude)) 286 is provided in the packet 485 in the data field or data section, and, in some preferred embodiments, the information 286 is added to the end of the data section.

As another useful example of such communications, the source device 260 may be configured for TCP/IP communications under the sixth version of the Internet Protocol (IP) or to provide IPv6 data packets (or IPv6 packets) to a receiving/querying client device 490 (e.g., an IPv6 client). In these cases, a communication link 494 is established according to IPv6 between the source device 260 and the receiving client device 490, and the source device 260 transmits an IPv6 data packet (or IPv6 packet) 495 to the receiving client device 490. According to the present description, the source device 260 is configured to include the received location information 286 (or a portion thereof) in the IPv6 data packet 495. In some embodiments, the received location information (e.g., GPS-related information) 286 is provided in the packet 495 in the data field or data section such as by adding it to the end of the data section while in other embodiments the information 286 is provided in or added to one of the spare fields of the header of the packet 495. In either case, the receiving device 480, 490 now has accurate location information (location coordinates and altitude) for the source device 260 (e.g., a sensor in a WSN).

Figure 5:
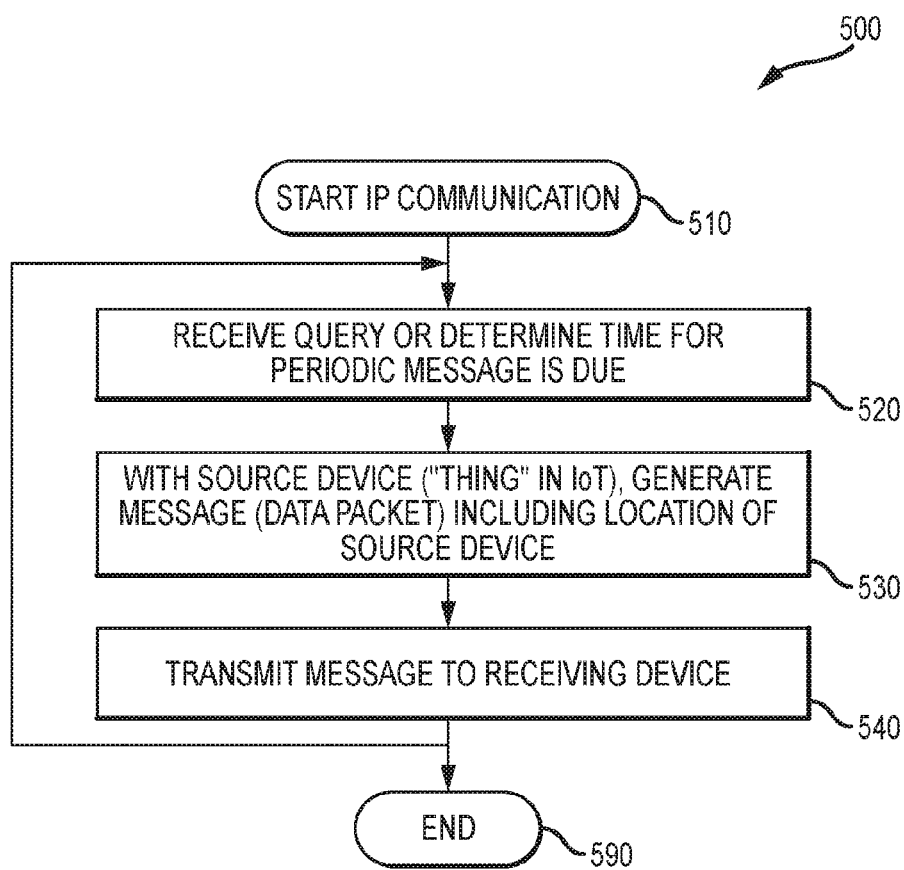
FIG. 5 is a flow diagram of a method/algorithm for generating and transmitting messages (e.g., IP packets) from the source device to a requesting or receiving client device networked with the source device.

FIG. 5 is a flow diagram of a method/algorithm 500 for generating and transmitting messages (e.g., IP packets or other network protocol packets) from the source device to a requesting or receiving client device networked with the source device. The method 500 starts at 510 such as with the source device connecting to a communications network such as wireless infrastructure supporting the cloud or the Internet, and such connection may be performed on a periodic basis by the source device rather than on an ongoing basis to save power (extend battery life). The method 500 continues at 520 with the source device receiving a query for data (or a "where are you" query) or by the source device determining that a period of time has lapsed indicating it is now time for a next message to be sent to a receiving client device (e.g., a central server may act to monitor a large number of sensors in a WSN or a client device may monitor objects or "things" in a portion of IoT).

At 530, the source device acts to generate a message that includes the location (location coordinates and altitude) of the source device. Particularly, the source device may be configured for transmitting IP packets (or other protocol packets) according to a version of the Internet Protocol (IP) or to provide TCP/IP-based communications to a receiving client device. As discussed above, the source device has in its memory location information (e.g., GPS-related information such as latitude and longitude coordinates, an altitude, and time information) that has been generated by a GPS-enabled device positioned on or near the source device such that it had a matching or nearly matching location in a physical space/environment (or is at a known or measured offset location to allow the GPS portion of the device to operate properly such as with a clear line of sight to one or more positional satellites). The source device in step 530 retrieves this location information (or a subset such as the latitude and longitude coordinate with or without the altitude) and inserts it into a data packet (or IP packet prior to transmitting the packet (which may also include sensor or other data collected by operation of the source device and its components)). In some implementations, the IP packet is an IPv4 packet, and the GPS-related information is provided at the end of the data section. In other cases, though, the IP packet is an IPv6 packet, and the GPS-related information is either added to the end of the data section of the packet or is provided in one (or more) of the spare fields in the header of the packet. At 540, the composed or generated IP packet (or data packet) is transmitted to the receiving client device for its use of the location information in monitoring and/or managing the network of devices/objects that includes this particular source device.

The method 500 then may continue at 520 with the source device waiting for a next query from the same or a different receiving computer or communications device and/or waiting for a next period of time to lapse prior to generating a next message at 530 and transmitting the next message at 540. Each message from the source device typically will include all or a subset of the GPS-related information or location information received from the portable computing device (e.g., a GPS-enabled handheld device). The method 500 may also end at 590.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A system for providing locations for a network of non-Global Positioning System (GPS) enabled devices, comprising:

a source device including memory; and a portable computing device, wherein the portable computing device comprises:
a processor;
a location-determining assembly operating, in response to a user input, to determine location information for the portable computing device; and
a location-transferring module run by the processor to provide the location information in the memory of the source device, wherein the location-transferring module initiates and establishes a communication session with the source device in response to the location-transferring module being initiated by a user input to the portable computing device and wherein the location information is only transmitted to the source device during the communication session, wherein the location information for the source device is generated by first positioning the portable computing device in a position proximate to the source device and receiving first user input to collect the location information, second operating the portable computing device to establish the communication session only after receiving second user input and third copying the location information gathered at the position proximate to the source device to the memory of the source device, wherein the source device is a non-GPS-enabled device.

2. The system of claim 1, wherein the location information is GPS-related information including latitude and longitude coordinates of the portable computing device.

3. The system of claim 2, wherein the location information further includes an altitude of the portable computing device.

4. The system of claim 1, wherein the location-determining assembly comprises a GPS receiver.

5. The system of claim 1, wherein the location-determining assembly is operated to determine the location information when the portable computing device is in a location gathering position relative to the source device.

6. The system of claim 5, wherein the location gathering position is at a location within 12 inches of the source device.

7. The system of claim 5, wherein the location information is modified based on an offset of the location gathering position from a physical location of the source device during the determining of the location information.

8. The system of claim 1, wherein the source device is configured for wireless communications to a remote client device and wherein the source device transmits at least a portion of the location information in the memory in a message to the remote client device.

9. The system of claim 8, wherein the wireless communications include TCP/IP-based communications and the message comprises an IP packet including the portion of the location information.

10. The system of claim 9, wherein the IP packet is an IPv4 packet and the portion of the location information is provided in the data field of the IPv4 packet.

11. The system of claim 10, wherein the portion of the location information is provided at the end of the data field of the IPv4 packet.

12. The system of claim 9, wherein the IP packet is an IPv6 packet and the portion of the location information is provided in a field of the header of the IPv6 packet or in the data field of the IPv6 packet.

13. A system of objects each providing its physical location over a communications network, comprising:

a monitoring device communicatively linked to the communications network; and
a plurality of non-GPS-enabled devices positioned at a plurality of locations in a physical space, wherein each of the non-GPS-enabled devices comprises:
a communications module operable to communicate messages to the monitoring device over the communications network; and
memory storing location information, wherein the location information is included in the messages communicated to the monitoring device and wherein the location information is received from a portable computing device in a communications session established by the portable computing device via the communications module,
wherein the portable computing device comprises a handheld GPS-enabled device and
wherein the location information for each of the non-GPS-enabled devices is generated by first positioning the handheld GPS-enabled device in a position proximate to the non-GPS-enabled device and receiving first user input to collect the location information, second operating the handheld GPS-enabled device to establish the communication session only after receiving second user input, and third copying the location information gathered at the position proximate to the non-GPS-enabled device to a predefined storage location in the memory of the non-GPS-enabled device.

14. The system of claim 13, wherein the messages comprise a network-communications packet and the location information is provided in one or more headers of the network-communications packet or in a data section of the network-communications packet.

15. A method for providing location information in messages from devices without location determining capabilities, comprising:
positioning a source device at a first location within a physical space;
positioning a portable computing device at a second location within a predefined distance from the source device;
first operating the portable computing device to determine location information corresponding to the second location;
second operating the portable computing device to initiate a communication session with the source device;
third operating the portable computing device, during the communication session, to provide the location information to the source device for defining the first location;
operating the source device to generate and transmit a message over a communications network, wherein the message includes at least a portion of the location information; and
modifying the location information prior to the third operating of the portable computing device based on an offset distance between the first and second locations.

16. The method of claim 15, wherein the location information includes latitude and longitude coordinates.

17. The method of claim 15, wherein the message comprises a digital communications packet and wherein the at least a portion of the location information is provided in a field of the header of the communications packet.

18. The method of claim 15, wherein the message comprises a digital communications packet and wherein the at least a portion of the location information is provided in a data section of the digital communications packet.

\* \* \* \* \*